(12) United States Patent
Topaltzas et al.

(10) Patent No.: US 8,874,043 B2
(45) Date of Patent: Oct. 28, 2014

(54) SYSTEM AND METHOD FOR DETERMINING QUALITY OF SERVICE OF A MOBILE DEVICE

(75) Inventors: Dimitrios M. Topaltzas, Ellicott City, MD (US); Jeffrey P. Horner, Leesburg, VA (US)

(73) Assignee: Spirent Communications, Inc., Sunnyvale, CA (US)

( * ) Notice: Subject to any disclaimer, the term of this patent is extended or adjusted under 35 U.S.C. 154(b) by 610 days.

(21) Appl. No.: 13/237,030

(22) Filed: Sep. 20, 2011

(65) Prior Publication Data

US 2013/0072126 A1    Mar. 21, 2013

(51) Int. Cl.
*H04B 17/00* (2006.01)
*H04W 24/08* (2009.01)

(52) U.S. Cl.
CPC .................... *H04W 24/08* (2013.01)
USPC .......... 455/67.11; 455/513; 725/24

(58) Field of Classification Search
CPC ..... H04W 24/10; H04W 24/08; H04W 28/06; H04W 48/20; H04W 64/00; H04L 5/0035; H04L 1/0027; H04L 1/1887; H04L 1/20; H04B 17/0042; H04B 17/0047; H04B 17/0077; H04B 7/024
USPC .............. 370/252, 312, 328–330, 338, 342; 455/423, 436, 450, 456, 509, 513, 561, 455/63.1, 67.11, 67.13
See application file for complete search history.

(56) References Cited

U.S. PATENT DOCUMENTS

| | | | |
|---|---|---|---|
| 2010/0042616 A1* | 2/2010 | Rinearson | 707/5 |
| 2010/0146553 A1* | 6/2010 | Lo et al. | 725/54 |
| 2010/0291959 A1* | 11/2010 | Inaida | 455/513 |
| 2011/0161484 A1* | 6/2011 | Van den Bogaert et al. | 709/224 |

* cited by examiner

*Primary Examiner* — Golam Sorowar
(74) *Attorney, Agent, or Firm* — Haynes Beffel & Wolfeld LLP; Ernest J. Beffel, Jr.

(57) ABSTRACT

A system and method for determining the quality of service in wireless data network by a plurality of mobile devices is provided. In one embodiment, the method includes presenting to a user a plurality of reference content items, for each content item, receiving a reference content item rating indicative of a quality rating provided by the user, wirelessly transmitting a test content item to the mobile device, presenting the transmitted test content item to the user; receiving a test content item rating provided by the user, wherein at least some of the plurality of reference content items comprise content items of known and differing quality, normalizing the test content item rating based on the reference content rating received to provide a normalized test content item rating; and outputting a quality of service performance metric based on the normalized test content item rating.

20 Claims, 2 Drawing Sheets

SYSTEM AND METHOD FOR DETERMINING QUALITY OF SERVICE OF A MOBILE DEVICE

FIELD OF THE INVENTION

The present invention generally relates to systems and methods for evaluating communication devices, and more particularly to systems and methods for evaluating and comparing the quality of service of mobile communication devices in live networks.

BACKGROUND OF THE INVENTION

Mobile communication devices have become ubiquitous in our society. Unlike conventional stationary devices, which typically operate in a home or office and receive data and information delivered via a wire and enjoy a highly consistent transmission medium, mobile devices are subjected to use under varying environments which result in a highly varying quality of service for various content to the end user. One challenge to those designing mobile devices is to design the devices to provide the desired quality of service even when the user is using the device in challenging and changing radio environments. Further, wireless network operators also want the users of their network to use mobile devices that provide adequate quality of service in all radio environments to ensure that the user has a satisfactory experience using their wireless network. Thus, there are numerous parties who desire to test the quality of service provided by mobile devices.

There are, however, a wide variety of mobile devices used for communicating over wireless data networks. With the proliferation of mobile devices, many designs have evolved. The different designs of mobile devices result in different performance characteristics for each device. Various design characteristics may impact the quality of services provided by a device and its ability to provide communications in varying radio environments. For example, the radio front-end of a mobile device, which drives, in part, the radiated performance (a devices ability to receive and transmit radio signals) of the device may positively or negatively impact the quality of service in various radio environments. Another factor may be the device's capability to cancel interfering radio signals from wanted radio signals in order to increase the signal-to-noise ratio and thereby improve the quality of service. Other design factors include (a) the performance of the device's digital signal processor, (b) the design of the device's operating system, (c) the content to be viewed by the user and associated applications including the handling of TCP/IP communication. As a result, the many different mobile devices have varying performance characteristics due to their design. Thus, different devices operating in the same radio environment provide different qualities of services.

In addition, another challenge to testing mobile devices is how to comparatively evaluate different model devices across different locations, at different times, in some instances using different people, and under the differing radio conditions present in live mobile networks. Thus, there is a need to objectively determine the quality of service provided by different mobile devices in receiving and presenting (outputting) different content types wherein the testing may be performed by different people in varying environments and at different times. These and other needs may be provided by one or more embodiments of the present invention.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

Figure 1:
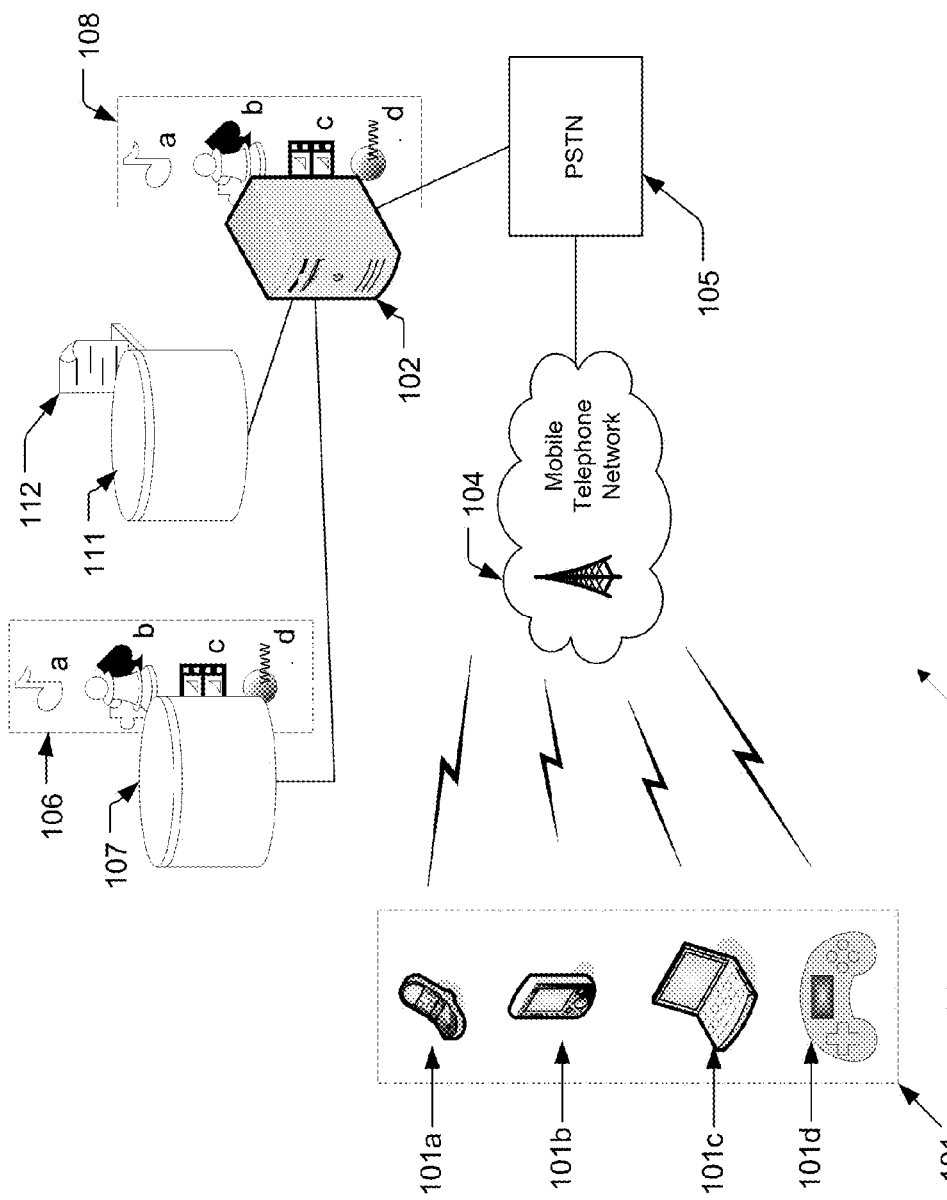
FIG. 1 is a block diagram of an example system for determining the voice quality of service provided by one or more mobile devices according to an example embodiment of the present invention.

In the following description, for purposes of explanation and not limitation, specific details are set forth, such as particular networks, communication systems, computers, terminals, devices, components, techniques, telephone devices, mobile devices, accessory devices, simulators, ear pieces, headsets, telephone handsets, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, networks, communication systems, computers, telephone devices, mobile telephones, accessory devices, simulators, ear pieces, headsets, telephone handsets, terminals, devices, components, techniques, data and network protocols, software products and systems, development interfaces, operating systems, and hardware are omitted so as not to obscure the description of the present invention.

According to an embodiment of the present invention, the quality of service performance of a mobile communication device (referred to herein as a mobile device), such as, but not limited to, a mobile telephone, game console, portable computer, tablet computer, and/or PDA (personal digital assistant), is evaluated in a wireless data network. As used herein, "mobile device" means a device configured to provide communication and/or data transfer services over a wireless data network which may include a mobile telephone network. Mobile devices may include accessories (e.g., a wired or wireless) such as an earpiece, headset, speaker phone (e.g., that includes a microphone and which may be, for example, in an automobile, or other device), or other such device that may be used with a mobile device. Many mobile devices support services such as SMS for text messaging, email, FTP, UDP, packet switching for access to the Internet, and MMS (Multimedia Messaging Service) for sending and receiving photos and video. In addition, a mobile device may provide the standard voice communications function of a telephone. A mobile device may provide such services by communicating via a wireless data network comprising a cellular network of base stations (cell sites), which is connected to the public switched telephone network (PSTN) and/or the internet. In combination, or in the alternative, mobile devices may communicate wirelessly to a router permitting public or private access to a wireless data network and/or the internet.

Embodiments of the present invention may be used to evaluate the quality of service provided by mobile devices for various content, locations, times of day, mobile communication standards and/or network protocols. The mobile device under test displays (and/or audibly produces) reference content items to the user of the device. The reference content items may include video content, audio content, gaming content, web content (e.g., HTML, Flash, etc.), and/or other content. Some of the reference content items may be similar to the original content (not degraded) and other reference content items may comprise content items purposely degraded in a predetermined manner. The user of the mobile device under test provides a rating of the quality of each reference content item. The mobile device under test also displays (and/or audibly produces) a test content transmitted to the mobile device from a content server over the wireless data network as a real time service. The test content typically will be of the same type of content as the reference content items. A quality rating of the test content is provided by the user. The ratings of the reference and test content items may be transmitted to the content server which may normalize the rating of test content item based on the ratings of the reference content items associated with the user and/or the mobile device. The normalized test content item ratings of a plurality mobile devices, including different models of mobile devices, may be compared, sorted, and output.

Thus, the use of reference content items of differing quality may enhance the rating process by providing a means to normalize the quality of service rating provided by different users and by the same user(s) over extended time periods. In addition the differing quality of the reference content items may provide a means of validating the rating data as will be discussed below.

Tests may be performed for a plurality of different mobile devices at different times, at different locations, with different networks, operated by different users and/or different types of content. Various statistical parameters of the plurality of quality of service ratings may be calculated and stored for the reference content items, test content items and the devices tested, including the average normalized quality of service rating (of the test content) of each model of a mobile device, the standard deviation of the normalized quality of service rating (of the test content) of the plurality of models of mobile device, and/or the percentage of normalized quality of service ratings above or below a selected performance threshold score.

As discussed, the quality of service ratings for the test content items associated with each device under test may be normalized based on the quality of service ratings of the reference content items of the same device (and user) to thereby provide objective comparisons of different mobile devices even when the devices present different content to different users at different locations and under different environmental and network conditions. As a result, the quality of service of multiple mobile devices to receive and output different content types may be meaningfully compared and meaningful performance metrics compiled.

In some embodiments, network data information may also be captured along with the quality of service ratings. Exemplary network information may include one or more of the following: signal to noise ratio, bit error rate, frame error rate, channel codec, received-signal level, downlink channel, channel type, handover statistics, and network name or identification. In some embodiments the network information may be from the device under test. In other embodiments, a separate measuring device may be used. The collected network information may be stored and used to further ensure a meaningful comparison by, for example, comparing only the normalized test content item ratings of different model mobile devices whose test content items were received under network conditions (e.g., signal-to-noise ratio, received-signal level) that satisfy a predetermined similarity threshold.

In some embodiments, location and time information also may be captured along with the quality of service ratings. Location information may include, for example, latitude and longitude of the mobile device during output of the test content item. Time information may include the time of day and date when mobile device displayed the test content item. The time and location information may be stored for each collection of quality of service ratings and periodically for each portion of network information. The time information may be used to select or derive network information for specific quality of service ratings. The collected time and/or information may be stored and used to further ensure a meaningful comparison by, for example, comparing only the normalized test content item ratings of different model mobile devices whose test content items were received at locations and/or times that satisfy a predetermined similarity threshold.

In addition, the quality of service test content ratings for all or a specific type of content may be associated (and/or sorted) with one or more network, time and/or location parameters based on the network information for the time period and/or area which the test content items were received and/or output.

Test System Environment

FIG. 1 depicts an example embodiment of a test system environment 100 for testing the quality of service of one or more mobile devices 101, which may include a mobile phone 101a, a PDA 101b, a portable computer 101c, a game console 101d and/or any other mobile device configured to provide communications over a wireless data network. The mobile devices 101 under test may include a test application that facilitates the testing and communicate with content server 102 through the wireless data network. The system also includes a reference content storage device 107 that stores the reference content items 106 and a ratings database storage device 111 that stores ratings data 112.

The content server 102 may include a voice server, a video content server, an image server, a web server, a database, and/or various other functional components and be configured to communicate (e.g., transmit reference and/or test content items) with a plurality of mobile devices 101 concurrently (e.g., and may have a plurality of telephone numbers and/or telephone ports associated with the server 102).

The wireless data network in this embodiment includes a mobile telephone communication network 104. The mobile telephone network 104 may comprise a radio network that includes a number of radio cells (sometimes referred to as "cells") each served by a fixed transmitter, known as a base station. Each cell covers a different area in order to provide radio coverage over a wider area than the area of any one cell. An exemplary mobile telephone network 104 may be based on any of various telecommunication standards, such as AMPS, D-AMPS, CDMA2000, GSM, CPRS, EV-DO, UMTS, EDGE, HSCSD, HSPA, FOMA, CDMA, WiMAX, G1, G1.5, G2, G3, and/or G4. Thus, the wireless data network may comprise a packet switched network, a circuit switched network or other network.

In other embodiments the communications network also may include wired or wireless networks in additional to (or in lieu of) mobile telephone network 104, such as an internet protocol (IP) network, a cable television network, a VoIP network, and/or other network. Thus, the devices under test 101 may communicate with the content server 102 along a communication path which includes the mobile telephone network 104 alone or in combination with one or more other networks.

In this example, the content server 102 is coupled to the mobile telephone network 104 via the public switched telephone network (PSTN) 105. The devices under test 101 each communicate with the content server 102 through the mobile telephone network 104. In other embodiments the content server 102 may be coupled directly to the mobile telephone network 104.

This example embodiment also includes a plurality of reference content items 106 to be presented by mobile devices 101 to a user that are stored in a storage device 107 that is accessible by content server 102. This configuration permits a plurality of different selections of reference content items 106 to be transmitted from the content server 102 to the mobile devices 101. In some embodiments, a plurality of selections of reference content items 106 may be stored on the mobile devices 101 and/or in a portable computer that may be co-located with (and communicatively coupled to) the mobile devices 101.

In the embodiment depicted in FIG. 1, the reference content items may comprise a plurality of different content types such as image content (e.g., photos), audio content 106a (e.g., voice and/or music), game content 106b, video content 106c and web content 106d. As discussed above, the reference content items 106 may include content items of differing quality.

The embodiment of FIG. 1 also includes test content items 108 stored on the content server 102 (or elsewhere such as on storage device 107). The test content items 108 may be stored at any suitable location that is accessible (such a through the internet) by the content server 102. As with the reference content items 106, the test content items 108 may include a plurality of types of content such as image content (e.g., photos), audio content 108a (e.g., voice and/or music), game content 108b, video content 108c and web content 108d. The test content items 108 may be exactly same as some of the (non-degraded) reference content items 107 except that the test content items are not degraded and represent ideal transmission quality content or may be similar to the reference content items. The test content items 108 in this embodiment are transmittable by content server 102 as a real time service and/or live streaming to mobile devices 101 through wireless data network 103 (as opposed to "downloading" of the content, which may be used for providing the reference content items to the mobile devices 101).

The embodiment depicted in FIG. 1 also includes a storage device 111 accessible by content server 102 such as via the Internet for storing the quality ratings 112 provided by users including ratings of both the reference content items and the test content items as well as normalized test content items, network conditions, time information, location information, and various statistical parameters of such data.

As discussed, the quality of some of the reference content items have a predetermined degradation (e.g., degraded to a known degree). Such degradation may include as, but is not limited to, pixilation, poor resolution, loss of sound, artifacts, sudden skipping and/or other qualities diminished to a known degree and thereby designed to provide a degraded content. One embodiment of a web browsing reference content item, for example, may include a series of simulated web pages with links to various content. The links may be configured to vary the speed at which the linked page is displayed when the linked is clicked by the user. In combination, or the alternative, the pages may be set to vary the speed at which content to be displayed on the page is loaded and/or the quality of presentation. The content, for example, may fail or appear to fail to load in some instances.

Likewise, an embodiment of a game reference content item may include a game to be played by the user of the mobile device containing all or a portion of the diminished qualities of the discussed embodiment web page reference content item, such as varied delays in processing user commands, skipping, lag, diminished quality of graphics and/or sound and/or unsynchronized audio and video content. An embodiment of audio and/or video reference content items may also contain skipping, lags and/or unsynchronized audio and video degradation.

Quality of Service Test Methods

Figure 2:
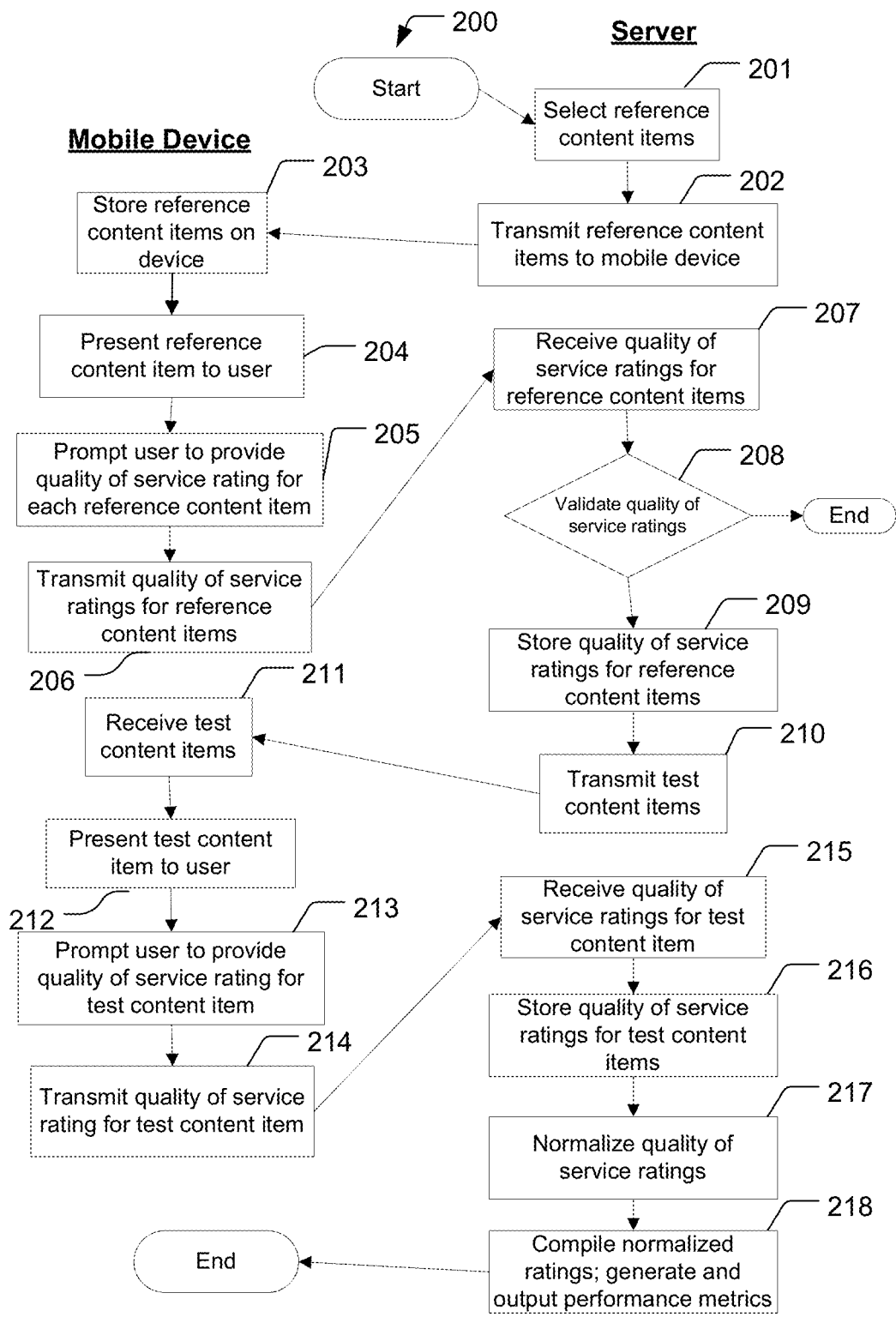
FIG. 2 illustrates an example method for determining quality of service according to an example embodiment of the present invention.

FIG. 2 illustrates a process 200 for testing quality of service in a wireless data network according to an example embodiment employed with the test system environment 100 depicted in FIG. 1. The test system environment 100 may be used with embodiments other than process 200. Likewise, process 200 may be used with embodiments other than test environment 100. Process 200 is discussed with reference to environment 100 simply to add understanding.

At 201 content server 102 selects a set of (a plurality of) reference content items 106 stored in storage repository 107. The selected reference contents may be content items of the same (or differing) types (e.g., all video content items) and have differing quality in that some of the reference content items of the set will be of higher quality than other reference contents items of the set. For example, the reference content items may comprise multiple video clips (e.g., displaying the same content or scenes) with one being a video clip not having any (known) imperfections (and substantially match the original) and the other video clips at least some of which (or all) having varying (and predetermined) amounts and/or severity of embedded artifacts (and/or other degradation). Information indicating the degree (and type) of degradation may be stored in memory of the server 102 or repository 107 in association with each reference content item. The reference content items selected at 201 may vary for each device 101 and/or test. In some embodiments, the same reference content items of a given type (e.g., video, audio, image, etc.) may be selected and used for testing multiple devices 101 by different users.

At 202, content server 102 transmits the set of selected reference content items to one or more mobile devices 101. The reference content items may be stored in the mobile devices 101 at 203. In some embodiments, the reference content items 203 may be presented to the user as they are received (real-time presentation) or stored for subsequent output to the user. At 204 the reference content items are presented (output) to the user by the mobile device 101, which may include initiating one or more other application programs on the mobile device 101 such as a video player in this example.

It is also possible that one or more sets of reference content items 106 may be downloaded to or otherwise stored on mobile devices 101 prior to the initiation of quality of service test. In such case, the content server 102 may transmit instructions to the mobile devices 101 with information to identify the reference content items to present to the user at 204. Alternately, the test application resident on the mobile device 101 may select the reference content items to present to the user based on the test selected by the user.

After viewing each reference content item 106, the test application on the mobile device 101 causes the display to display a request to the user to provide a quality of service rating for the presented reference content item at 205. The ratings provided may be numerical, such as, but not limited to, a score on a scale of a defined numerical range (e.g. one to ten or one to five). Thus, the ratings may be binary, continuous, or discrete (e.g., a mean opinion score) including semantic (e.g. "excellent", "acceptable", "fair", "poor", etc.), any of which may be converted to a numerical score (if necessary).

The quality ratings 112 are transmitted from the mobile device 101 over wireless data network 103 at 206 and received by the content server 102 at 207. In some embodiments, the quality of server ratings of the reference content items may be stored on the mobile device 101 and transmitted along with the quality of service rating provided by the user for the test content item.

The received ratings may be validated by the content server at 208. The validation process may comprise determining whether the user-supplied ratings of the reference content items satisfy a similarity threshold with the quality of the reference content items, which are known to the server 102. In one example embodiment, validation comprises comparing the rank of the user supplied quality of service ratings (of one or more of the reference content items) to the rank of the known quality of the reference content item(s) to ensure that the quality of service ratings provided by the user match (or approximate) the known quality of the reference content items. If, for example, the poorest quality reference content items receives a higher quality of service rating than a higher or the highest quality reference content item, the validation process fails which may indicate that the user did not view (or listen) to the reference content items or did not care enough to provide a genuine rating (meaning that the ratings 112 provided by the user are inaccurate and/or otherwise invalid). If the quality ratings 112 received from a mobile device 101 for the reference content items 106 are invalid, the quality of service rating for the test content item 108 may be discarded and the process terminated. If the reference content quality ratings 112 for the reference content items 106 are validated as determined by process 208, the ratings 112 may be stored by storage device 111 at 209.

At 210 the content server 102 transmits (or streams) the test content items 108 as a real time and/or live networked source streaming content, which are received by the mobile device 101 at 211. Process 210 may be initiated by the test application on the mobile device 101 which may place a call (or otherwise open a data connection) with the content server 102. The test content items 108 may be the same type as the selected reference content items 107 and, in one example, may be the exact same content item (e.g., depict the same scene) of one or all the selected reference clips 107. The mobile device outputs the test content items 108 to the user at 212, which may include initiating one or more other application programs on the mobile device such as a video player in this example. In some embodiments, the mobile device 102 may format or re-format content items for presentation by an intended application of the mobile device 101.

At 213, the test application on the mobile device 101 outputs a request (by displaying and/or audibly producing the request) to the user to input a quality rating 112 for the test content item 108. The test application on the mobile device 101 receives the user input of the rating 112 for the test content items 108 and stores the information in memory. The mobile device 101 then transmits the user-supplied quality rating 112 to the content server 102 at 214. The quality ratings are received by the content server 102 at 215 and may be stored on storage device 111 at 216.

In addition to the quality ratings 112, network information at the time the test content item 108 is received (at 211) also may be collected by the mobile device 101 and transmitted at 214. Example network information may include one or more of the following: signal strength, cell ID, signal-to-noise ratio, bit error rate, frame error rate, channel codec, received-signal level, downlink channel, channel type, handover statistics, and network name or identification. In addition, location and time information at the time the test content item 108 is received (at 211) may be collected by the mobile device 101 and transmitted at 214. Example location information may include latitude and longitude of the mobile device 101 at which the test content item is received. Example time information may include the time of day and date at which the user test content item is received. The network, time and location information (corresponding to time of receipt of the test content item) may be stored in the storage device 111 in association with each test content item rating 112 supplied by the user. In addition, information identifying the user also may be collected (or known) by the mobile device 101, transmitted to and stored (in the storage device 111) by the server 101 in association with the rest content item ratings.

In the explanation of this example embodiment the ratings of the reference content items are described as being transmitted from the mobile device 101 separately from the ratings of the test content items 108. In some scenarios and/or embodiments, the ratings of the reference content items may be stored on the mobile device 101 until the user has rated at least one (but perhaps two or more) test content items and then transmitted along with the ratings of the one or more test content items.

At 217 the quality rating associated with each test content item (stored in storage device 111) from each mobile device 101 is normalized based on the ratings of the reference content items received from that mobile device 101 and supplied by the same user (as the user who supplied the rating for the test content item). As is known to those skilled in the art, different users may rate the same content differently. Likewise, a given user may (unintentionally) rate content of a given quality differently at different times. In addition, the environment and/or the network conditions at a given location may inhibit a mobile device's ability to receive and/or output content. In order to reduce the "variations" in rating provided by different users, over time, and at different locations, in this embodiment the quality rating of each test content item may be normalized based on the quality ratings of the reference content items provided by the same user (and mobile device 101). Normalization based on the reference content item ratings seeks to negate or reduce user subjectivity's effect on the rating data, thus allowing underlying characteristics of the ratings data sets to be compared, which allows data on different "user rating scales" to be compared by bringing them to a common scale.

Various normalization processes may be used. In one example embodiment, the normalization may include by dividing the rating accorded to the test content item by the sum (or average) of the reference content item ratings provided by a user from the same mobile device 101. For example, if four reference content items are rated (with four different levels of quality), the user's four ratings of the four reference content items may be summed (or averaged) and then divided into the test content item rating to provide the normalized test content item rating. The normalized test content item rating associated with each of a plurality mobile devices may then be sorted and/or compared to provide a more meaningful comparison (than would be provided without normalization). In another example embodiment, normalization may include subtracting the average (or mean) of the user's ratings of the four reference items from (or by) the user's rating of the test contest item. In still another example, normalization may include subtracting the average (or mean)

of the user's ratings of the four reference items from (or by) the user's rating of the test contest item and then dividing this value by the mean (or average) of the user's ratings of the four reference items.

Various statistical parameters for each device 101 also may be provided. For example, the content server 102 may determine (1) an average normalized quality (of service) rating for each mobile device and across multiple devices; (2) a standard deviation of the quality of service ratings for each device and across multiple devices; (3) a mean of the quality service ratings samples for each device and across multiple devices; (4) a percentage of quality of service ratings above a threshold for each device and across multiple devices; (5) a percentage of quality of service ratings below a threshold for each device and across multiple devices; and (6) any of the preceding for a each (or any) particular content type. The results of this processing may be stored in storage device 111 and/or elsewhere accessible by content server 102 and output.

At 218 the normalized results may be processed (e.g., compiled, sorted, etc.) and output to provide normalized quality of service performance metrics for different mobile devices 101, networks, times of test, and/or content types of the test items. Even though the test scenarios may not be the same for each of the tested devices 101, the ratings are normalized to thereby reduce the impact of differing users, network environments and/or conditions. Accordingly, meaningful performance metrics for quality of service may be provided. The performance metrics may include the mean and standard deviation of the normalized quality of service rating for particular models of mobile devices and/or networks.

The mobile device 101 under test may include a display, a user interface, and a test application stored on non-transitory tangible medium that comprises program code executable by a controller of the device 101 to perform the testing including, but not limited to, (1) outputting (e.g., displaying or audibly producing) a request to the user to input a rating of the previously outputted content item; (2) receiving (and storing) inputs from the user of ratings of reference and test content items; (3) transmitting user supplied ratings to the content server 102; (4) collecting network information; (5) collecting time and location information; and (6) performing various other functions to facilitate the testing. Alternately, the test application may reside on a portable computing device co-located with the mobile device and user. The content server 102 may include a server test application stored on non-transitory tangible medium that comprises program code executable by a controller of the server 102 to perform the testing including, but not limited to, (1) selecting the content items; (2) transmitting content items; (3) receiving and storing ratings; (4) normalizing test content ratings based on reference content items ratings; (5) receiving and storing network information; (6) receiving and storing location and time information; (7) communicating with and controlling the test application on the mobile devices 101 (in some embodiments); and (8) performing various other functions to facilitate the testing.

It is worth noting that the content server 102 may stream content. Streaming media (i.e., audio-video content) is content sent in compressed form and displayed (and the audio output) by the receiving mobile device in real time. In other words, the media is sent in a continuous stream of data and is output as it arrives. The receiving user mobile device typically will include an end user application (e.g., a video player) that uncompresses and sends video data to the display and audio data to an audio output device (e.g., a speaker or headphones). A video player can be either an integral part of a browser or a stand alone application.

In contrast to streaming media, progressive downloading of media is a type of media transmission more commonly used over the Internet. For example, almost all of the video content offered by YouTube® comprises video content available for progressive download as of this writing. With progressive downloading, the media content file (e.g., video or audio file) is transmitted, typically stored locally on the device (e.g., buffered), and presented (e.g., video displayed and audio played).

A streaming content server may require a specific or fixed allocation of bandwidth for each stream and can often support only a fixed number of users. Since progressive download is similar to a web page or file being delivered from a web server, there is no specific bandwidth allocated to a particular user. With most streaming servers, content is not downloaded, or cached, on the hard drive as it is with progressive download. Some embodiments of the present invention are concerned with testing the capabilities of mobile devices to receive and play streaming test content items.

The users herein may comprise the general public, a large group of participants, or a panel of users. While the above described embodiment streams video content from the content server 102, in other embodiments speech may be produced by the content server 102 (which includes a voice server) as the test content item. Each mobile device (and/or each model of each mobile device) may be tested by multiple users, at different and multiple locations, times, and networks, and with multiple content types, with different (or the same) reference and test content items.

Thus, in one embodiment, a method of determining a quality of service provided by a plurality of mobile devices that communicate over a wireless data network, comprises (a) presenting to a user a plurality of reference content items with the mobile device; (b) for each content item presented to the user, receiving a reference content item rating indicative of a quality rating provided by the user; (c) receiving a test content item via the wireless data network at the mobile device; (d) presenting the transmitted test content item to the user with the mobile device; (e) receiving a test content item rating indicative of a quality rating for the transmitted test content item provided by the user; wherein at least some of the plurality of reference content items comprise content items of known (which may be stored in memory) and differing quality; performing (a)-(e) for each of the plurality of mobile devices; for each of the plurality of mobile devices, normalizing the test content item rating received from each mobile device based on the reference content rating received by the mobile device to provide a normalized test content item rating; and outputting a quality of service performance metric for the plurality of mobile devices that is based on the normalized test content item rating of the plurality of mobile devices. The method may further comprise determining whether the reference content item ratings received by each of the plurality of mobile devices are valid; and discarding the test content item rating from the mobile device if the reference content item ratings are not valid. At least some of the plurality of reference content items may comprise items having a predetermined quality degradation and, for example, may include artifacts. The test content item and the plurality of reference content items may comprise video content, audio content, gaming content, and/or web content. The method may further comprise with each of the plurality of mobile devices, transmitting data representing the user input indicative of the quality rating of the test content item and of the plurality of reference content items to a remote device; and wherein the normalizing is performed by said remote device. The test content item may be received as streaming content. The normalizing may comprise dividing data of the test content item rating by data of the plurality of reference content item ratings. The method may further comprise with each mobile device, transmitting network information determined for the network during the reception of the test content item and with each of the plurality of mobile devices, transmitting location information of the mobile device during reception of the test content item.

In yet another embodiment, a computer program product stored in one or more non-transitory tangible computer readable having executable instructions to determine a quality of service provided by a mobile device that communicates over a wireless data network, may comprise a code segment to transmit a test content item to each of a plurality of mobile devices via a communication path that includes the wireless data network; a code segment to receive a plurality of reference content ratings from each of the plurality of mobile devices; wherein each of the plurality of reference content ratings corresponds to a different reference content item; wherein at least some of the plurality of reference content items comprise content items of differing (and known or predetermined) quality; a code segment to receive a test content rating from each of the plurality of mobile devices; a code segment to normalize the test content rating based on the plurality of reference content ratings for each of the plurality of mobile devices; and a code segment to output one or more performance metrics based on the normalized test content rating of each of the plurality of mobile devices. The computer program product may further comprise a code segment executable to determine whether the reference content ratings received from each of the plurality of mobile devices is valid. The computer program product may further comprise a code segment executable to receive and store in a memory, for each mobile device, network information collected by each of the plurality of mobile devices during receipt of the test content item. The computer program product may further comprise a code segment executable to store in a memory, for each mobile device, latitude, longitude and time during the transmission of test content item. The code segment to normalize the test content rating may be configured to divide data of the test content item rating by data of the plurality of reference content item ratings.

In yet another embodiment, a method of determining the quality of service provided by a plurality of mobile devices communicating over a wireless data network, may comprise receiving a plurality of reference content ratings from a plurality of mobile devices; wherein each of the plurality of reference content ratings corresponds to a different reference content item; wherein at least some of the plurality of reference content items comprise content items of differing and predetermined quality; transmitting a test content item to each of the plurality of mobile devices via the wireless data network; receiving a test content rating from each of the plurality of mobile devices; normalizing the test content rating based on the plurality of reference content ratings for each of the plurality of mobile devices; and outputting one or more performance metrics based on the normalized test content rating of each of the plurality of mobile devices. The method may further comprise determining whether the reference content ratings received from each of the plurality of mobile devices are valid; and discarding the test content rating received from the device if reference content ratings received from the mobile device are not valid.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of determining a performance metric provided by a plurality of mobile devices that communicate over a wireless data network, comprising:
   (a) transmitting from a content server a plurality of reference content items of differing content quality to be viewed and rated;
   (b) for the plurality of reference content items transmitted, receiving by the content server a reference content item rating indicative of a quality rating provided by a mobile device user;
   (c) validating the received reference content item rating against a range of ratings considered valid for the reference content item;
   (d) transmitting a test content item via the wireless data network to be viewed and rated at the mobile device after validating the reference content item ratings;
   (e) receiving by the content server a test content item rating indicative of a quality rating for the test content item provided by the user;
   performing (a)-(e) for plurality of additional mobile devices;
   normalizing the test content item ratings received from the mobile devices based on the reference content ratings received from the respective mobile devices; and
   outputting normalized performance metrics for the plurality of mobile devices.

2. The method according to claim 1, further comprising determining whether the reference content item ratings received by each of the plurality of mobile devices are valid; and
   discarding the test content item rating from a first mobile device if the reference content item ratings received by the first mobile device are not valid.

3. The method according to claim 1, wherein at least some of the plurality of reference content items comprise content items having a predetermined quality degradation.

4. The method according to claim 3, wherein at least some of the plurality of reference content items include artifacts.

5. The method according to claim 1, wherein the test content item and the plurality of reference content items comprise video content.

6. The method according to claim 1, wherein the test content item and the plurality of reference content items comprise web content.

7. The method according to claim 1, wherein the test content item and the plurality of reference content items comprise game content.

8. The method according to claim 1, wherein the test content item and the plurality of reference content items comprise audio content.

9. The method according to claim 1, further comprising with each of the plurality of mobile devices, transmitting data representing the user input indicative of the quality rating of the test content item and of the plurality of reference content items to a remote device; and
   wherein said normalizing is performed by said remote device.

10. The method according to claim 1, wherein the test content item is received as streaming content.

11. The method according to claim 1, wherein said normalizing comprises dividing data of the test content item rating by data of the plurality of reference content item ratings.

12. The method according to claim 1, further comprising with each mobile device, transmitting network information determined for the network during reception of the test content item.

13. The method according to claim 1, further comprising with each of the plurality of mobile devices, transmitting location information of the mobile device during reception of the test content item.

14. A computer program product stored in one or more non-transitory tangible computer readable medium having executable instructions to determine a performance metric of a mobile device that communicates over a wireless data network, comprising:
   a code segment to transmit a plurality of reference content items of differing content quality to be viewed and rated to a plurality of mobile devices via a communication path that includes the wireless data network;
   a code segment to receive reference content ratings from the plurality of mobile devices;
   a code segment to validate each of the plurality of reference content items against a range of ratings considered valid for the reference content item;
   a code segment to transmit a test content item after the reference content item is validated;
   a code segment to receive a test content rating indicative of a quality rating of the test content item;
   a code segment to normalize the test content ratings received from the mobile devices based on the plurality of reference content ratings from the respective mobile devices; and
   a code segment to output normalized performance metrics for the plurality of mobile devices.

15. The computer program product according to claim 14, further comprising a code segment executable to determine whether the reference content ratings received from each of the plurality of mobile devices is valid.

16. The computer program product according to claim 14, further comprising a code segment executable to receive and store in a memory for each mobile device, network information collected by each of the plurality of mobile devices during receipt of the test content item.

17. The computer program product according to claim 14, further comprising a code segment executable to store in a memory, for each mobile device, location information and time information during receipt of the test content item.

18. The computer program product according to claim 14, wherein said code segment to normalize the test content rating is configured to divide data of the test content item rating by data of the plurality of reference content item ratings.

19. A method of determining the quality of service provided by a plurality of mobile devices communicating over a wireless data network, comprising:
   transmitting a plurality of reference content items to a plurality of mobile devices;
   receiving a plurality of reference content ratings from the plurality of mobile devices;
   wherein each of the plurality of reference content ratings corresponds to a different reference content item;
   wherein at least some of the plurality of reference content items comprise content items of differing and predetermined quality;
   validating the received reference content item ratings against a range of ratings considered valid for the reference content item;
   transmitting a test content item to each of the plurality of mobile devices via the wireless data network after validating the reference content item ratings;
   receiving a test content rating indicative of a quality rating for the test content item from each of the plurality of mobile devices;
   normalizing the test content rating based on the plurality of reference content ratings for each of the plurality of mobile devices; and
   outputting one or more performance metrics based on the normalized test content rating of each of the plurality of mobile devices.

20. The method according to claim 19, further comprising determining whether the reference content ratings received from each of the plurality of mobile devices are valid; and
   discarding the test content rating received from the device if reference content ratings received from the mobile device are not valid.

* * * * *